Patented Sept. 30, 1952

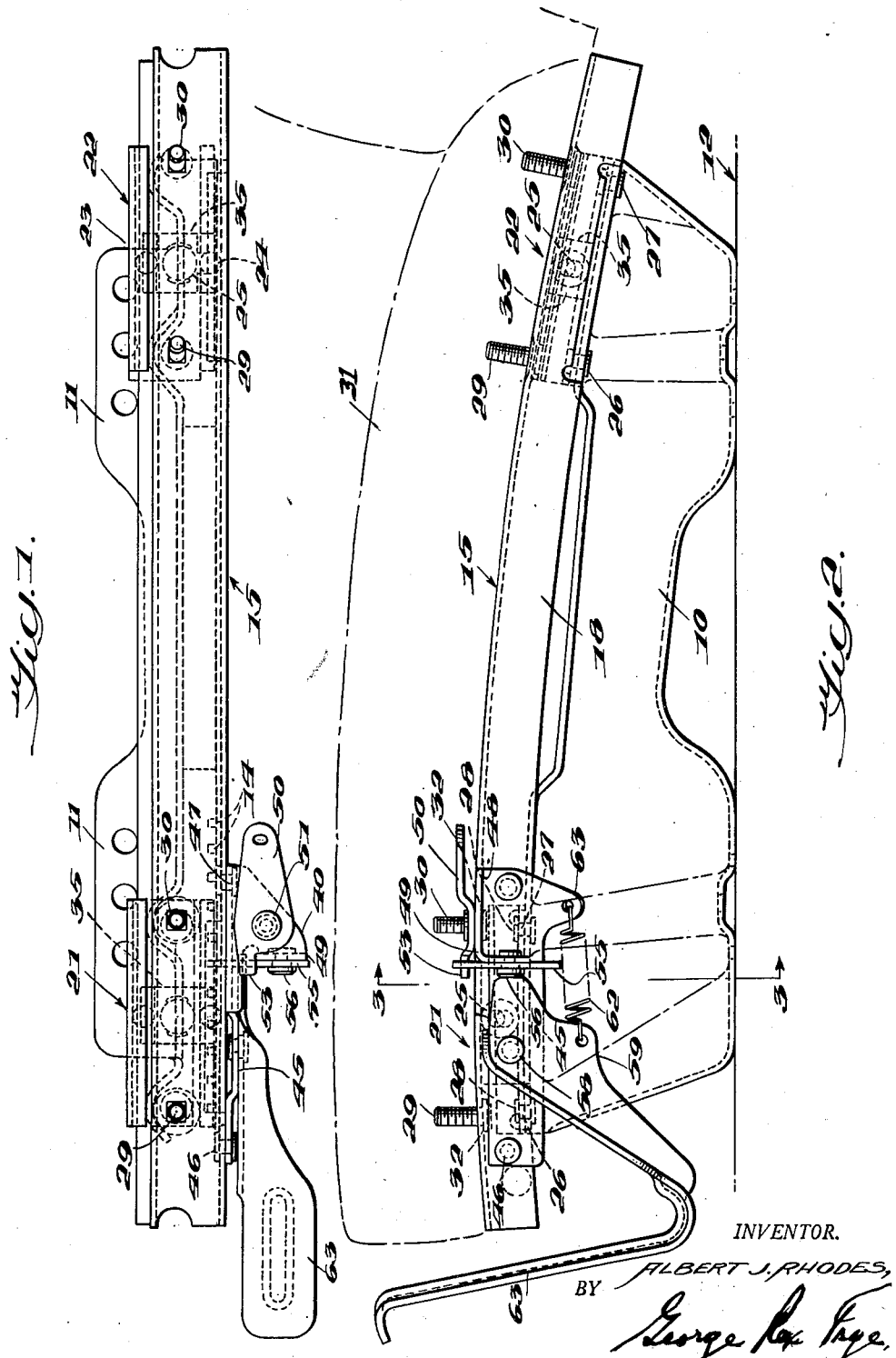

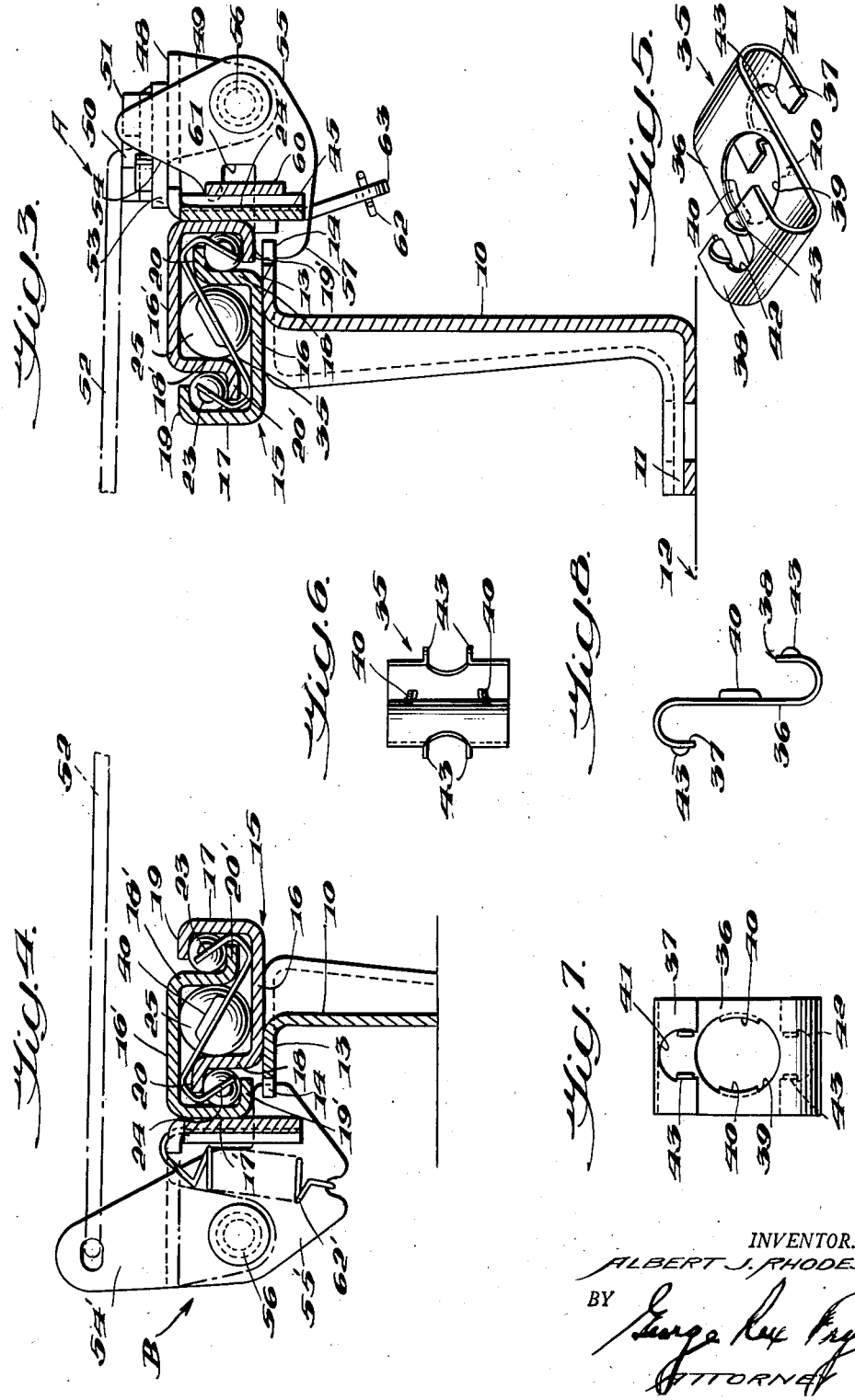

2,612,208

UNITED STATES PATENT OFFICE 2,612,208

SEAT ADJUSTER ASSEMBLY

Albert J. Rhodes, Pontiac, Mich., assignor to American Forging and Socket Company, Pontiac, Mich., a corporation of Michigan Application April 13, 1950, Serial No. 155,730

8 Claims. (Cl. 155—14)

This invention relates to improvements in adjustable supports, particularly but not exclusively for the seats of vehicles, and more specifically concerns improvements in the type of supports which utilize roller balls in conjunction with upper and lower channel forms which are of substantially similar cross section but reversed in position, the upper channel forms serving as carriages and the lower channel forms serving as tracks, such type of support being exemplified in Patent No. 2,285,616, dated June 9, 1942, and issued to Walter L. Saunders and Ray R. Peterson.

A primary object of the invention is to provide in a device of the character indicated above an improved arrangement of roller balls and reversed but similiar cross section channel forms whereby greater care of operation and over-all stability and further economies in fabrication of the channel forms and in the assembling of the device are obtained by elimination of formed ball races and the substitution therefor of both vertical and horizontal line contacts between the balls and the channel forms.

Another important object of the invention is to provide an assembly of the character indicated having a ball retainer and spacing member associated with each group of three balls whereby the balls are retained in transverse alignment and prevented from lagging behind or preceding the center balls, and the center or middle balls are utilized to control the travel of the outer balls and the need for separate stops for the outer balls is eliminated, whereby still further savings in fabrication and assembly are obtained, along with smoother adjustment and greater over-all stability of the assembly.

A further important object of the invention is to provide manual carriage locking and releasing mechanism of improved and more efficient design, which is more easily operable to release position and locks more positively to maintain adjusted positions of the carriages.

Other important objects and advantageous features of the invention will be apparent from the following description and the accompanying drawings, wherein, for purposes of illustration only, a specific embodiment of the invention is set forth in detail.

In the drawings, wherein like numerals designate like parts throughout the several views:

Fig. 1 is a plan view of one of the seat adjuster assemblies embodying my invention, Fig. 2 is a side elevation thereof, with a seat cushion and back rest shown in dotted lines, Fig. 3 is a vertical section taken substantially on the line 3—3 of Fig. 2, Fig. 4 is a similar section, with parts broken away of the companion seat adjuster assembly used at the opposite side of a vehicle to complete an adjustable seat support, Fig. 5 is a perspective view of one of the ball retainer and spacing members used for maintaining three ball bearings in lateral alignment during adjustments of the seat, Fig. 6 is an end view, Fig. 7 a plan view, and Fig. 8 a side view of the ball retainer and spacing member.

Referring in detail to the drawings, the illustrated vehicle seat adjuster involves left and right hand units A and B, respectively, each having a vertical longitudinal stamping 10 having laterally inwardly projecting portions 11 on the lower edges thereof for anchoring in suitable manner, not shown, to the vehicle floor 12. The upper edges of the stamping 10 have along limited portions of forward parts thereof laterally outwardly projecting flanges 13 whose outer edges are formed with longitudinally spaced squared notches 14.

Mounted on and suitably fixed to the upper edges of the stampings 10 over the flanges 13 are the tracks 15 which are curved downwardly in a rearward direction, as shown in Figure 2, and consist of die-formed channels having plane bottom walls 16, plane vertical inner side walls 17 rising from the laterally inward edges of the bottom walls 16, and plane vertical outer side walls 18 rising from the laterally outward edges of the bottom walls 16, the inner and outer side walls being related to the bottom walls at right angles.

The inner side walls 17 are wider than the outer side walls 18 and have right angular laterally outwardly projecting plane flanges 19 on their upper edges. The narrower outer side walls 18 have similar plane flanges 20 on their upper edges which project laterally inwardly, on a level below the flanges 19.

On each track 15 is mounted a pair, consisting of similar front and rear carriages 21 and 22, respectively, which are relatively short as compared to the length of the track 15 and are confined to movement along limited forward and rearward portions of the track. Each carriage comprises a channel of the same cross sectional shape and dimensions as the track 15, having the bottom wall 16', the side walls 17' and 18', and the flanges 19' and 20', respectively. As shown in Figures 3 and 4, the carriage channels are inverted relative to the tracks 15 and are assembled to the tracks with their short side walls 18' between the track side walls 17 and 18 and their wider side walls 17 located laterally outwardly of the outer track side walls 18.

The positioning of the carriage channels on the tracks 15 is such that the inner side wall flanges 19 of the track are vertically aligned with and spaced above the side wall flanges 20' of the carriage channels, and the outer side wall flanges 20 of the tracks 15 are vertically aligned with and spaced above the carriage outer channel side wall flanges 19'. The various side walls and flanges are spaced laterally from each other as well as vertically so that there are no sliding or abutting contacts between the carriages and tracks. The flanges 19 and 19' and 20 and 20' are of the same effective width, so that by their positional relationships they form substantially square cross section ball races accommodating the small inner and outer balls 23 and 24, respectively, which are of the same size, and are of a diameter to form vertical line contacts with the middle of the opposed flanges 19 and 20' and 20 and 19', respectively, and to form horizontal line contacts with the side walls 17 and 18' and 18 and 17', respectively. Since the balls 23 and 24 effectively occupy the ball races, both vertical and transverse or sidewise movement of the carriages relative to the tracks 15 is positively precluded, while greater smoothness and freedom of longitudinal movement of the carriages along the tracks is afforded by the small frictional and rolling contact provided by the line contact of the balls.

Bearing the main burdens of the carriages on the tracks are relatively large center or middle balls 25, which are of a diameter to effectively occupy the square cross section ball race defined by the side walls 18' and 18 and the bottom walls 16' and 16. With this arrangement the large middle balls 25 have only vertical line contact with the bottom walls 16' and 16 and only horizontal line contact with the side walls 18' and 18 and the large middle balls 25 act in conjunction with the smaller balls 23 and 24 to support the carriages for free longitudinal movement relative to the tracks 15.

Front and rear headed fasteners 26 and 27, respectively, utilized to secure the tracks 15 to the stampings 10 have heads 28 projecting above the track bottom walls 16, as shown in Figure 2, so as to act also as stops for the larger middle balls. The carriages have forward and rearward headed studs 29 and 30, respectively, projecting upwardly from their bottom walls 16' to securably mount a seat cushion structure 31 on the carriages 21 and 22. The lower ends of the studs have heads 32 projecting below the bottom walls 16' in approximate vertical alignment with the fastener heads 28 and serve as upper stops for the larger middle balls 25.

No such upper or lower stops are provided for the smaller inner and outer balls 23 and 24, respectively, and need for them is eliminated by the provision of the ball retainer and spacing member 35, shown in detail in Figures 5 to 8. The member 35 consists of a relatively thin sheet of spring metal plate of elongated rectangular form, having a plane middle portion 36, and curvedly return bent end portions provided with plane end portions 37 and 38, respectively, which are positioned at opposite sides of the middle portion 36 and in parallel spaced relation thereto, as shown particularly well in Figures 5 and 8, in the relaxed condition of the member 35.

The middle portion 36 is centrally formed with a circular opening 39, slightly larger in diameter than the larger middle ball 25, and diametrically opposed peripheral ball engaging flanges 40, rise from opposite edges of the opening and extend longitudinally on the middle portion 36. The free edges of the end portions 37 and 38 are centrally indented with semi-circular openings 41 and 42, respectively, aligned with the opening 39 and slightly larger in diameter than the inner and outer smaller balls 23 and 24. Ball engaging ears 43, project from opposite side edges of the openings 41 and 42 in directions away from the middle portion 36.

The ball retainer and spacing members 35 are placed between the tracks 15 and carriages 21 and 22, with the larger balls 25 in position in the openings 39 and the smaller balls 23 and 24 in position in the openings 41 and 42, respectively, so that the balls occupy operative positions in their races between the stops 28 and 32. On being placed in position the end portions 37 and 38 of the member 35 are tensioned away from parallelism to the middle portion 36, as shown in Figures 3 and 4, so that the member 35 is tensioned by the balls with the middle portion 36 in a diagonal position, and the middle portion 36 and the end portions 37 and 38 are normally out of contact with the bottom walls 16 and 16' and the various flanges of the track 15 and carriages 21 and 22. As a result the three balls are positively held in transverse alignment across the tracks and carriages and the smaller balls 23 and 24 are prevented from trailing or preceding the larger middle ball 25 in any movement of the carriages along the tracks. Further, the larger middle balls 25 positively control the travel of the smaller balls 23 and 24 and engagement of the middle ball 25 with the stops 28 and 32 provided therefor has the effect of stopping the smaller balls, both as to the travel of the carriages on the tracks and as to travel of the smaller balls relative to the carriages.

As shown in Figures 1 to 4, the novel locking means shown comprises, besides the flanges 13 already mentioned as formed with squared notches 14, vertical, longitudinally elongated plates 45 secured as indicated at 46 and 47 to the outer sides of the flanges 17' of the forward carriages 21. The plates 45 have horizontal lateral flanges 48 near their rearward ends which have vertical lugs 49 depending from their forward edges. A motion transfer lever 50 is vertically pivoted at 51 on the upper side of the flange 48 and has the rearward end thereof operatively connected to a tie rod 52 extending across between the two units A and B. The forward end of the lever 50 has a nose 53 positioned inwardly of the inclined laterally inward edge 54 of vertical cam plate 55 which is horizontally pivoted, as indicated at 56, on the forward side of the lug 49. The right hand unit B also has a cam plate 55' having an upward extension 54' connected to the tie rod 52. Both cam plates have inwardly projecting terminals 57 arranged to engage in the notches 14 of the flanges 13 to hold the carriages in selected adjusted positions along the tracks 15. Horizontally pivoted at 58 on the plate 45 of the left hand unit A in front of the cam plate 55 is the forwardly declining plate-like lever 59 having a rearwardly projecting nose 60 engaging in the notch 61 of the terminal 57 of the related cam plate 55. Below its pivot the lever 59 has attached thereto the forward end of a contractile spring 62 whose rearward end is attached to a depending ear 63 on the related plate 45, the spring 62 thereby serving to tension the forward part of the lever 59 downwardly and to tension its nose 60 upwardly and thereby tension the cam plate 55 inwardly to engage its terminal 57 against the edge of the flange 13 and be active to engage in any one of the notches 14 the terminal may become registered with. The cam plate 55 of the left hand unit A transmits the same action to the cam plate 55' of the right hand unit B through the related motion transfer lever 50 and the tie rod 52. The service of the spring 62 is provided for the right hand unit B by a contractile spring 62' hooked under the cam plate 55 and over the upper part of the plate 45, as shown in Figure 4.

The lower end of the lever 59 has a forwardly inclined hand lever portion 63 arranged to be grasped in the hand and raised to disengage the terminals 57 of the cam plates 55 and 55' from the notches 14 in the flanges 13 and thereby face the seat structure 31 to be adjusted forwardly or rearwardly along the tracks 15 in the usual manner by a person seated thereon.

What is claimed is:

1. In an adjustable support for a seat or the like, a track having a bottom wall and a pair of laterally spaced upwardly projecting side walls forming a channel therebetween, a laterally projecting race forming flange on each side wall and extending in the same direction whereby one flange overhangs said bottom wall and the other flange projects laterally outwardly from said channel, a carriage shaped similarly to said track and inverted with its race forming flanges underhanging and aligned with the corresponding race forming flanges of said track to provide outer races, said bottom walls being vertically aligned to provide a middle race between said outer races, outer balls confined in said outer races, a middle ball confined in said middle race, and an S-shaped ball retainer and spacer having its terminal portions embracing said outer balls and its intermediate portion embracing said middle ball and holding said outer balls and said inner ball spaced from each other and in alignment across said track and carriage.

2. In an adjustable support for a seat or the like, a track having a bottom wall and a pair of laterally spaced upwardly projecting side walls forming a channel therebetween, a laterally projecting race forming flange on each side wall and extending in the same direction whereby one flange overhangs said bottom wall and the other flange projects laterally outwardly from said channel, a carriage shaped similarly to said track and inverted with its race forming flanges underhanging and aligned with the corresponding race forming flanges of said track to provide outer races, said bottom walls being vertically aligned to provide a middle race between said outer races, outer balls confined in said outer races, a middle ball confined in said middle race, and an S-shaped ball retainer and spacer having its terminal portions embracing said outer balls and its intermediate portion embracing said middle ball and holding said outer balls and said inner ball spaced from each other and in alignment across said track and carriage, said ball retainer and spacer being supportably mounted on the balls and maintained thereby out of contact with said track and said carriage.

3. In an adjustable support for a seat or the like, a track having a bottom wall and a pair of laterally spaced upwardly projecting side walls forming a channel therebetween, a laterally projecting race forming flange on each side wall and extending in the same direction whereby one flange overhangs said bottom wall and the other flange projects laterally outwardly from said channel, a carriage shaped similarly to said track and inverted with its race forming flanges underhanging and aligned with the corresponding race forming flanges of said track to provide outer races, said bottom walls being vertically aligned to provide a middle race between said outer races, outer balls confined in said outer races, a middle ball confined in said middle race, and an S-shaped ball retainer and spacer having its terminal portions embracing said outer balls and its intermediate portion embracing said middle ball and holding said outer balls and said inner ball spaced from each other and in alignment across said track and carriage, said ball retainer and spacer being supportably mounted on the balls and maintained thereby out of contact with said track and said carriage, longitudinally spaced stop heads projecting upwardly from the bottom wall of said track in line with said middle ball for engagement by said middle ball to limit endwise movement of said carriage relative to said track in opposite directions.

4. In an adjustable support for a seat or the like, a track having a bottom wall and a pair of laterally spaced upwardly projecting side walls forming a channel therebetween, a laterally projecting race forming flange on each side wall and extending in the same direction whereby one flange overhangs said bottom wall and the other flange projects laterally outwardly from said channel, a carriage shaped similarly to said track and inverted with its race forming flanges underhanging and aligned with the corresponding race forming flanges of said track to provide outer races, said bottom walls being vertically aligned to provide a middle race between said outer races, outer balls confined in said outer races, a middle ball confined in said middle race, and a ball retainer and spacer having portions embracing said outer balls and said middle ball and holding said outer balls and said inner ball spaced from each other and in alignment across said track and carriage, said ball retainer and spacer being supportably mounted on the balls and maintained thereby out of contact with said track and said carriage, said ball retainer and spacer comprising a spring metal plate having a plane middle portion formed with a circular opening providing edges retainably engaging said middle ball, oppositely directed end portions at opposite sides of said middle portion formed with openings providing edges retainably engaging said outer balls, said end portions being tensioned relative to said middle portion in opposite directions.

5. In an adjustable support for a seat or the like, a track having a bottom wall and a pair of laterally spaced upwardly projecting side walls forming a channel therebetween, a laterally projecting race forming flange on each side wall and extending in the same direction whereby one flange overhangs said bottom wall and the other flange projects laterally outwardly from said channel, a carriage shaped similarly to said track and inverted with its race forming flanges underhanging and aligned with the corresponding race forming flanges of said track to provide outer races, said bottom walls being vertically aligned to provide a middle race between said outer races, outer balls confined in said outer races, a middle ball confined in said middle race, and a ball retainer and spacer having portions embracing said outer balls and said middle ball and holding said outer balls and said inner ball spaced from each other and in alignment across said track and carriage, the aligned race forming flanges being plane and parallel, said side walls and said bottom walls being plane and parallel whereby the outer races and said middle race are of polygonal cross section each bounded by four angularly related plane surfaces with which the balls are in vertical and horizontal line contact.

6. In an adjustable support for a seat or the like, a track having a bottom wall and a pair of laterally spaced upwardly projecting side walls forming a channel therebetween, a laterally projecting race forming flange on each side wall and extending in the same direction whereby one flange overhangs said bottom wall and the other flange projects laterally outwardly from said channel, a carriage shaped similarly to said track and inverted with its race forming flanges underhanging and aligned with the corresponding race forming flanges of said track to provide outer races, said bottom walls being vertically aligned to provide a middle race between said outer races, outer balls confined in said outer races, a middle ball confined in said middle race, and a ball retainer and spacer having portions embracing said outer balls and said middle ball and holding said outer balls and said inner ball spaced from each other and in alignment across said track and carriage, said ball retainer and spacer being supportably mounted on the balls and maintained thereby out of contact with said track and said carriage, said flanges being right angular with respect to said side walls, with the side walls and bottom walls parallel whereby the cross sections of the outer races and the middle race are square with each race affording pairs of right angularly related surfaces with which the balls are in vertical and horizontal line contact, respectively.

7. In combination with a movable seat structure including a carriage, a track structure including a raceway for slidably supporting said carriage thereon, said track structure having a laterally projecting flange, said flange being formed with longitudinally spaced notches, and locking means mounted on the adjacent side of said carriage, a lock member having a terminal engageable in any selected one of said notches so as to preclude endwise movement of said carriage relative to said track, and spring means tensioning said lock member inwardly, said locking means further comprising a forwardly extending hand lever mounted on said carriage having a handle arm and another arm, a cam plate pivoted on said carriage with which said other arm is operatively engaged, said hand lever being manually swingable from a retracted position against the tension of said spring means to a release position on which said lock member is retracted from notch engaging position and permits free endwise movement of said carriage relative to said track.

8. In combination with a movable seat structure including a carriage, a track structure including a raceway for slidably supporting said carriage thereon, said track structure having a laterally projecting flange, said flange being formed with longitudinally spaced notches, and locking means mounted on the adjacent side of said carriage, a lock member having a terminal engageable in any selected one of said notches so as to preclude endwise movement of said carriage relative to said track, and spring means tensioning said lock member inwardly, said locking means further comprising a forwardly extending hand lever mounted on said carriage having a handle arm and another arm, a cam plate pivoted on said carriage with which said other arm is operatively engaged, said hand lever being manually swingable from a retracted position against the tension of said spring means to a release position on which said lock member is retracted from notch engaging position and permits free endwise movement of said carriage relative to said track, and a motion transmitting lever pivoted on said carriage and operatively engaged with said lock member for transmitting the motion of said lock member to another lock member on another carriage.

ALBERT J. RHODES.

REFERENCES CITED

The following references are of record in the file of this patent:

UNITED STATES PATENTS

| Number | Name | Date |
|---|---|---|
| 2,285,616 | Saunders et al. | June 9, 1942 |
| 2,540,125 | Kolks | Feb. 6, 1951 |